Figure 1:
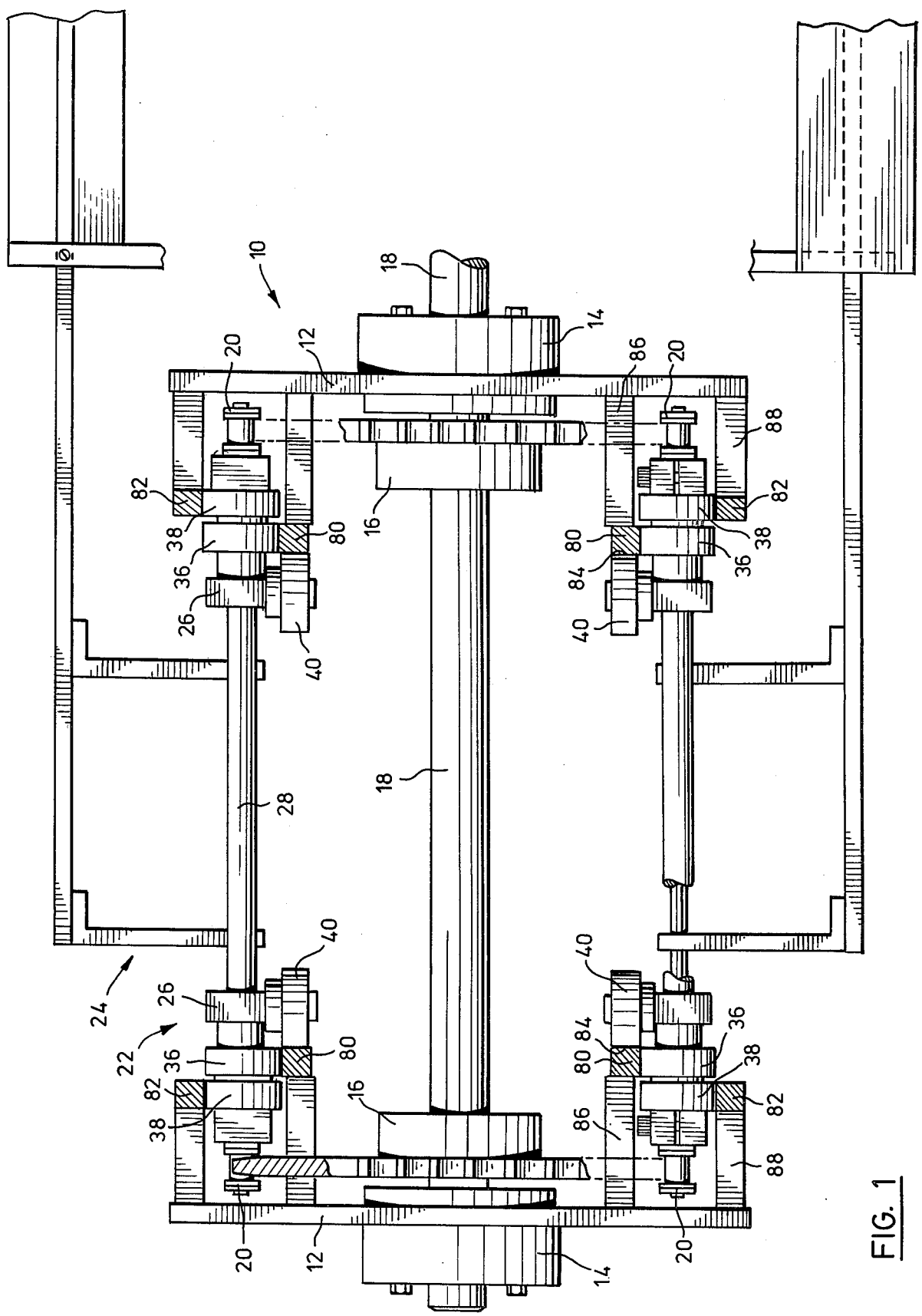

United States Patent [19]

Langen

[11] 4,440,294
[45] Apr. 3, 1984

[54] CONVEYOR

[75] Inventor: Marinus J. M. Langen, Rexdale, Canada

[73] Assignee: H. J. Langen & Sons Limited, Mississauga, Canada

[21] Appl. No.: 9,846

[22] Filed: Feb. 6, 1979

[51] Int. Cl.³ .............................................. B65G 15/60
[52] U.S. Cl. ..................................... 198/838; 198/845
[58] Field of Search ................ 198/732, 838, 840, 845

[56] References Cited

U.S. PATENT DOCUMENTS 3,228,171 1/1966 Cory ..................................... 198/732
4,101,020 7/1978 Langen ................................ 198/732

FOREIGN PATENT DOCUMENTS 2323602 4/1977 France ................................. 198/838

Primary Examiner—Joseph E. Valenza
Attorney, Agent, or Firm—Fetherstonhaugh & Co.

[57] ABSTRACT

A conveyor assembly is disclosed herein in which the conveyor is supported by a first set of rollers which will rotate on an underlying guide rail and a second set of rollers which will rotate on an overlying guide rail thereby restraining the conveyor against vertical movement. Laterally disposed guide tracks engage a third set of rollers and restrain the conveyor against lateral movement.

2 Claims, 3 Drawing Figures

CONVEYOR

FIELD OF INVENTION

This invention relates to conveyor assemblies. In particular, this invention relates to a conveyor assembly in which the conveyor is supported and restrained to limit its movement to movement in the direction of the longitudinal extent of the conveyor.

PRIOR ART

In many conveyors it is customary to provide a guide track at the oppositely disposed longitudinal edges thereof for supporting the conveyor in the longitudinal direction. When guide rollers are arranged to roll along a guide track and are restrained from above and below by guide rails, the rotation of the guide roller with respect to one of the rails must be in a direction counter to that required to permit the roller to roll therealong. As a result, rollers frequently scuff along one rail and develop wear flats which make the rotation of the support rollers difficult.

The difficulties encountered in the prior art as described above have been overcome in the conveyor of the present invention by providing separate guide tracks disposed above and below the conveyor with separate sets of guide rollers arranged to engage the separate guide rails whereby one set of guide rollers may rotate in one direction to provide a support in one direction and the other set of guide rollers may rotate in the opposite direction while providing support in the direction opposite to that provided by the first support rollers.

SUMMARY OF INVENTION

According to one aspect of the present invention, there is provided a conveyor assembly which comprises an endless conveyor member extending in an endless path opposite said endless conveyor having oppositely disposed longitudinally extending marginal edges, means for supporting and guiding said conveyor member for longitudinal movement along said endless path including guide means at each marginal edge, each guide means comprising; a first guide rail extending parallel to and adjacent its associated marginal edge and disposed inwardly of said endless path, a second guide rail extending parallel to and adjacent its associated marginal edge and disposed outwardly from said endless path and cooperating with said first guide rail to define a guide track therebetween, said second guide rail being laterally spaced with respect to said first guide rail, a plurality of first and second support rollers mounted at longitudinally spaced intervals along each marginal edge of said conveyor in longitudinal alignment with said first and second guide rails respectively so as to be locatable in said guide tracks with the first rollers in rolling engagement with and restrained against movement inwardly of said endless path by said first guide rail and the second guide rollers being located in rolling engagement with and restrained against movement outwardly of said endless path by said second guide rail.

PREFERRED EMBODIMENT

Figure 2:
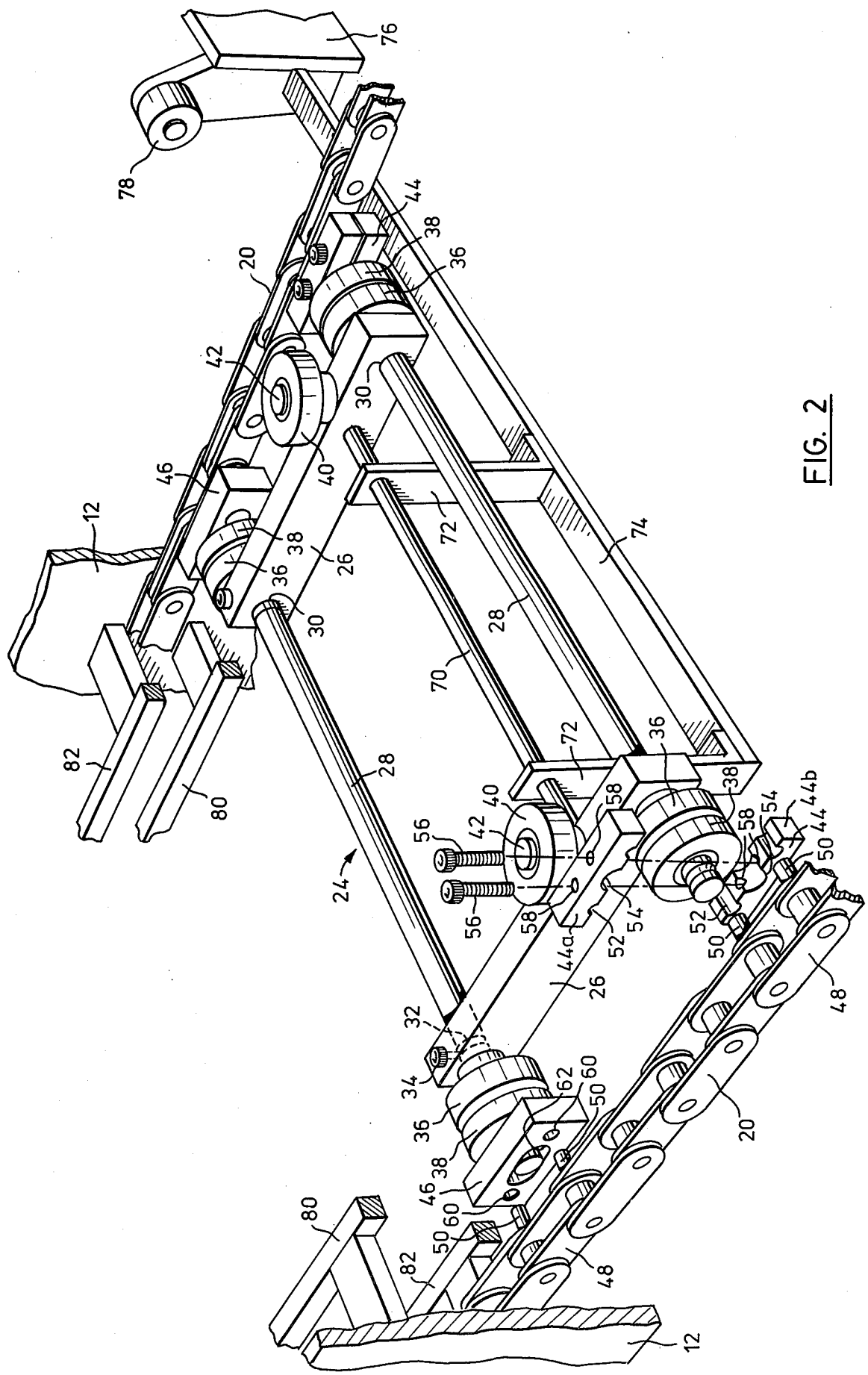
Figure 3:
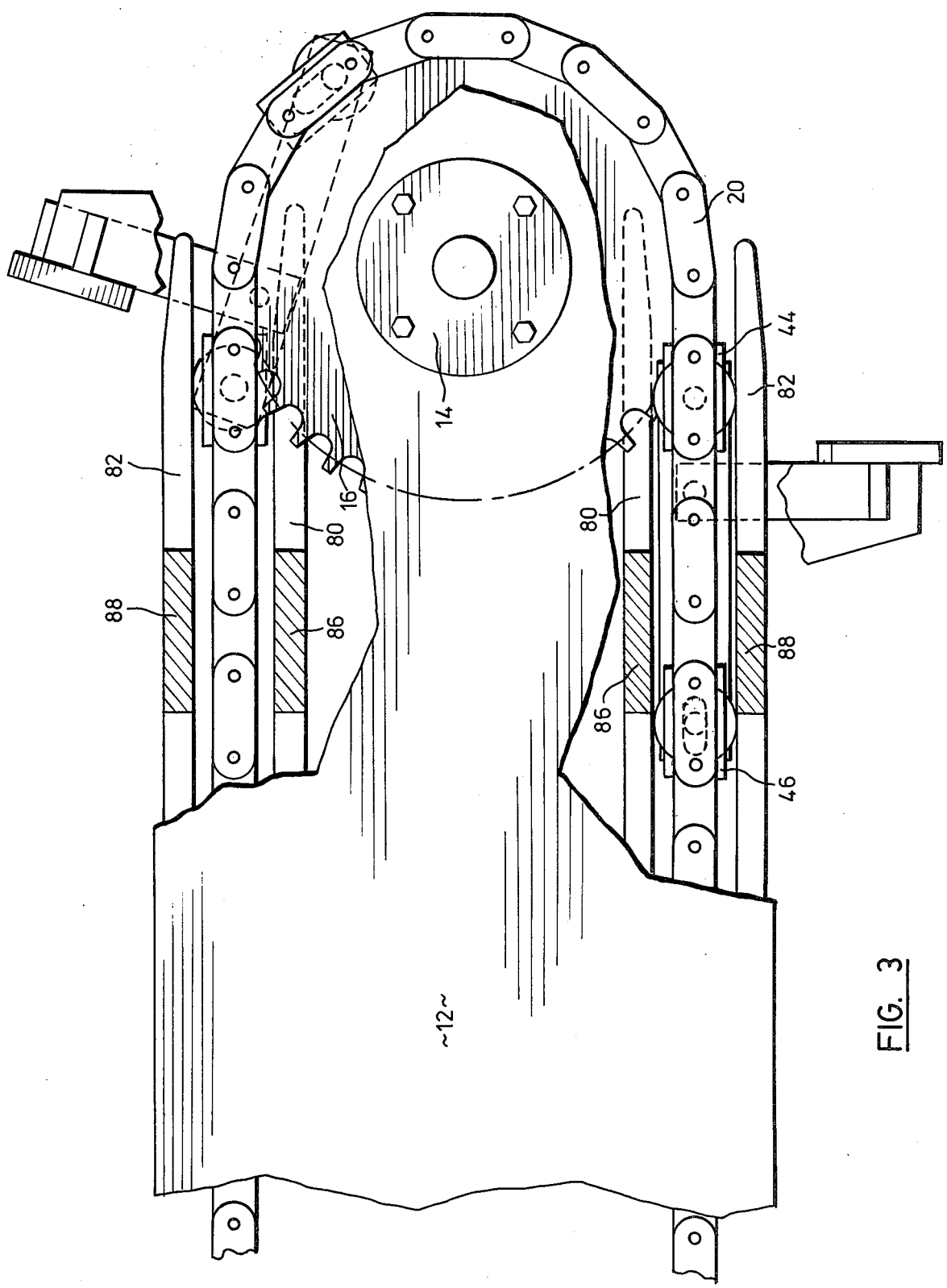

The invention will be more clearly understood after reference to the following detailed specification read in conjunction with the drawings wherein, FIG. 1 is a sectional side view through a conveyor constructed in accordance with an embodiment of the present invention;

FIG. 2 is a partially exploded pictorial view of a portion of the conveyor of FIG. 1, and FIG. 3 is a partially sectioned side view of one end of the conveyor of FIG. 1.

In the drawings, the reference numeral 10 refers generally to the conveyor constructed in accordance with an embodiment of the present invention. The conveyor has a frame which includes a pair of oppositely disposed support plates 12. Bearings 14 are mounted on the plates 12 directly opposite one another at each end of the support plates 12. A drive shaft 18 is journalled in the bearings 14 and sprockets 16 are mounted on and secured for rotation with the shaft 18. A pair of endless chains 20 are arranged at opposite sides of the conveyor and extend around sprockets 16. The chains 20 are located at opposite marginal edges of the endless conveyor member which is generally identified by the reference numeral 22. The conveyor member includes a plurality of carriage members 24 which are located at spaced intervals along the length of the chains 20 and which extend transversely between the chains 20. Each carriage member 24 includes a pair of longitudinally extending beam members 26 which are secured in a spaced parallel relationship by transversely extending shafts 28. The shafts 28 extend through passaages 30 formed in the longitudinally extending beam members 26 and are provided with shallow circumferentially extending recesses 32 into which clamping screws 34 project. The shafts 28 project outwardly from the beam members 26 and have first support rollers 36 and second support rollers 38 mounted for rotation thereon. It will be noted that the first support rollers 36 are aligned with one another in the longitudinal direction of the conveyor as are the second support rollers 38. Third support rollers 40 are mounted on support shafts 42 which project inwardly of the endless path of the conveyor from the longitudinal support beams 26.

In order to mount the carriages 24 onto the chains 20, mounting blocks 44 and 46 are provided. The chains 20 are provided with links 48 which have elongated legs 50 projecting inwardly therefrom. The mounting blocks 44 are formed into two halves identified as 44a and 44b each of which has semicircular passages 52 and 54 extending transversely thereof. The passages 52 are arranged to cooperate with one another to clampingly engage the legs 50 of the links 48 and the passages 54 cooperate with one another to engage the outer end of the shaft 28. Mounting screws 56 are arranged to extend through passages 58 in the section 44a of the support block and are threadable within the passages 58 of the section 44b of the mounting block 44 so as to clamp the halves 44a and 44b together in the configuration shown at the right hand side of FIG. 2. The support blocks 46 are provided with passages 60 within which elongated support pins 50 of the links 48 are located. Elongated slot 62 is provided in each of the support blocks 46 so that the outward ends of the shafts 28 may move longitudinally with respect to the blocks 46 to permit the carriage 24 to negotiate the curvature of the conveyor path formed as a result of travel around the sprockets 16.

The carriages 24 are particularly suitable for use in transporting a load transfer pusher blade mechanism of the type described in U.S. Pat. No. 4,101,020, dated July 18, 1978, Langen, and a portion of this structure is illustrated in the drawings. This structure includes the shaft 70 extending transversely between the longitudinal beams 26 and a pair of arms 72 which are pivotably mounted at their inner end on the shaft 70. A cantilever arm 74 is mounted at the outer end of the arms 72 and projects laterally outwardly from the path of travel of the conveyor and has a pusher blade 76 located at the outer end thereof. A cam follower 78 is mounted on the pusher blade 76 for movement along a predetermined cam track. The pusher blade 76 is rotatable about the axis of the shaft 70 in response to adjustment of the position of the cam follower 78 in use. In the conveyor of the present invention it is important to ensure that adequate support is provided for the conveyor to prevent both vertical and lateral displacement of the conveyor when loads are applied thereto in use. Vertical control of the position of the conveyor is provided by longitudinally extending first and second guide rails 80 and 82 which are located in alignment with the first rollers 36 and second rollers 38 respectively. The support rails 80 are located inwardly of the endless path of the conveyor and the support rails 82 are located outwardly of the endless path of the conveyor and thus the conveyor is restrained against inward movement by the contact which is established between the first rollers 36 and the first guide rail 80 and it is restrained against outward movement by the contact which is established between the second rollers 38 and the second support rails 82.

Lateral support is provided by locating the third rollers 40 so that they are supported by the inwardly directed side face 84 of the first support rails 80. The support rails 80 and 82 are supported in the required position by support brackets 86 and 88 which are secured with respect to the face plates 12 at spaced intervals along the length of the face plates 12.

In use, it will be noted that as the chains 20 are driven along the endless conveyor path, the first rollers 36 will roll on the first rails 80 and the second rollers 36 will roll along the second support rails 82 and third support rollers 40 will roll along the side faces 84 of the first support rails 80. The first support rails 80 are laterally spaced with respect to the second support rails 82 so that there is no contact between the first roller 36 and the second support rail 82 and there is no contact between the second roller 36 and the first support rail 80. It will be noted that during movement of the conveyor, the first rollers 36 will rotate in one direction about the shafts 28 and the second rollers 38 will rotate in the opposite direction about the shaft 28. Because independent guide rails are provided for each set of support rollers, the counter rotation of the rollers does not result in any scuffing at the interface between the rollers and their corresponding support surfaces.

Various modifications of the present invention will be apparent to those skilled in the art without departing from the scope of the invention.

What I claim as my invention is:
1. A conveyor assembly comprising:
   (a) a frame;
   (b) an endless conveyor member extending in an endless path, said endless conveyor comprising;
      (i) a pair of endless transmission roller chains supported by sprockets, at least one of which is driven, said chains being arranged in a spaced parallel relationship at opposite sides of said endless path,
      (ii) a plurality of support shafts mounted on and extending laterally between said endless chains,
      (iii) first and second rollers mounted on said support shaft at each side of said conveyor member, the first rollers being longitudinally aligned with respect to one another and the second rollers being longitudinally aligned with respect to one another, the first and second rollers being laterally spaced with respect to one another,
   (c) first and second guide rail means mounted on said frame and extending parallel to the longitudinal extent of each side of said endless conveyor, said first guide rail being disposed inwardly of said endless path in alignment with said first rollers for supporting said first rollers against movement inwardly of said endless path, said second guide rails being disposed outwardly of said endless path in alignment with said second rollers and laterally spaced from said first rollers so as to support said second rollers against movement outwardly from said endless path and be out of engagement with said first rollers,
   (d) sprocket means on said frame drivingly engaging said endless chains for movement along said endless path with said first rollers and said second rollers rolling along said first and second guide rails respectively while rotating in opposite directions thereby to provide a scuff free support for said endless conveyor.

2. A conveyor assembly as claimed in claim 3 further comprising;
   (a) a pair of third guide rails mounted on said frame and arranged one at each side of said endless conveyor and extending parallel to the longitudinal extent of said endless conveyor, each third guide rail having a support surface directed laterally inwardly of said conveyor,
   (b) a plurality of third guide rollers mounted at longitudinally spaced intervals along each side edge of said conveyor for rotation about axes extending perpendicular to the longitudinal extent of said conveyor, the third guide rollers at each marginal edge being disposed between and arranged in rolling engagement with the third guide rails to prevent lateral displacement of said conveyor.

* * * * *